United States Patent
Shipley et al.

(10) Patent No.: US 9,363,691 B1
(45) Date of Patent: Jun. 7, 2016

(54) APPLICATION TRANSFER NEGOTIATION FOR A MEDIA DEVICE

(75) Inventors: Trevor Daniel Shipley, Olathe, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1560 days.

(21) Appl. No.: 12/686,509

(22) Filed: Jan. 13, 2010

(51) Int. Cl.
*H04W 24/04* (2009.01)
*H04L 12/26* (2006.01)

(52) U.S. Cl.
CPC .............. *H04W 24/04* (2013.01); *H04L 43/04* (2013.01)

(58) Field of Classification Search
CPC ................................ H04W 24/04; H04L 43/04
See application file for complete search history.

(56) References Cited

U.S. PATENT DOCUMENTS

| | | | |
|---|---|---|---|
| 6,947,067 B2 | 9/2005 | Halttunen | |
| 7,266,836 B2 | 9/2007 | Anttila et al. | |
| 7,487,112 B2* | 2/2009 | Barnes, Jr. | 705/26.8 |
| 2006/0015738 A1* | 1/2006 | Hallensleben | 713/182 |
| 2006/0094423 A1* | 5/2006 | Sharma et al. | 455/433 |
| 2006/0203758 A1 | 9/2006 | Tee et al. | |
| 2007/0058794 A1 | 3/2007 | Abrol et al. | |
| 2007/0157234 A1 | 7/2007 | Walker | |
| 2007/0157240 A1 | 7/2007 | Walker | |
| 2007/0157241 A1 | 7/2007 | Walker | |
| 2007/0157260 A1 | 7/2007 | Walker | |
| 2007/0169164 A1* | 7/2007 | Marilly et al. | 725/135 |
| 2007/0180448 A1* | 8/2007 | Low et al. | 718/1 |
| 2007/0271358 A1 | 11/2007 | Gaddy | |
| 2008/0141303 A1 | 6/2008 | Walker et al. | |
| 2008/0181213 A1* | 7/2008 | Ovsiannikov et al. | 370/389 |
| 2008/0272934 A1* | 11/2008 | Wang et al. | 340/870.11 |
| 2009/0172747 A1* | 7/2009 | Vantalon et al. | 725/61 |
| 2009/0217326 A1* | 8/2009 | Hasek | 725/87 |
| 2011/0126192 A1* | 5/2011 | Frost et al. | 717/178 |
| 2011/0161500 A1* | 6/2011 | Yengalasetti et al. | 709/227 |

* cited by examiner

*Primary Examiner* — Jianye Wu (57) ABSTRACT

A wireless communication device is capable of communication with a media server over a first communication network and capable of communication with a media device over a second communication network. The wireless communication device comprises a wireless communication interface and a processing system. The processing system is configured to monitor for an application request, wherein the application request indicates an application provided by the media server for display on the media device. The processing system is further configured to determine a first bandwidth available on the first communication network and a second bandwidth available on the second communication network, and determine if the first bandwidth and the second bandwidth support the application based on the application. The wireless communication interface is configured to, if the first bandwidth and the second bandwidth support the application, receive the application from the media server and transfer the application to the media device, wherein the media device displays the application.

20 Claims, 5 Drawing Sheets

APPLICATION TRANSFER NEGOTIATION FOR A MEDIA DEVICE

TECHNICAL BACKGROUND

Many individuals are increasingly utilizing wireless communication devices to stream media content from sources over a communication network. For example, a user of a wireless communication device may request audio, video, text, and other data from a media server and the media server will stream the requested content to the wireless communication device. When the user of the wireless communication device requests an application from the media server, typically the requested application is transferred from the content provider to the communication device for the use or enjoyment of the user.

Typically, the user of the wireless communication device executes the application or displays the content on the requesting communication device. However, some users may desire to transfer the content to a separate media device, which may have different processing or display capabilities than the wireless communication device. To achieve this goal, the user must interface the wireless communication device with the media device to enable a data transfer. For example, one manner of interfacing the wireless communication device with the media device is to establish a data connection over a communication link utilizing a communication protocol. Alternatively, one could simply connect an analog or digital video cable between the wireless communication device and the media device. Regardless of the manner in which the devices are interfaced, the end result is a transfer of the media content from the wireless communication device to the media device. In this manner, the user may view or execute a streaming application on the media device instead of the communication device that initially receives the application.

OVERVIEW

A wireless communication device is capable of communication with a media server over a first communication network and capable of communication with a media device over a second communication network. The wireless communication device comprises a wireless communication interface and a processing system. The processing system is configured to monitor for an application request, wherein the application request indicates an application provided by the media server for display on the media device. The processing system is further configured to determine a first bandwidth available on the first communication network and a second bandwidth available on the second communication network, and determine if the first bandwidth and the second bandwidth support the application based on the application. The wireless communication interface is configured to, if the first bandwidth and the second bandwidth support the application, receive the application from the media server and transfer the application to the media device, wherein the media device displays the application.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
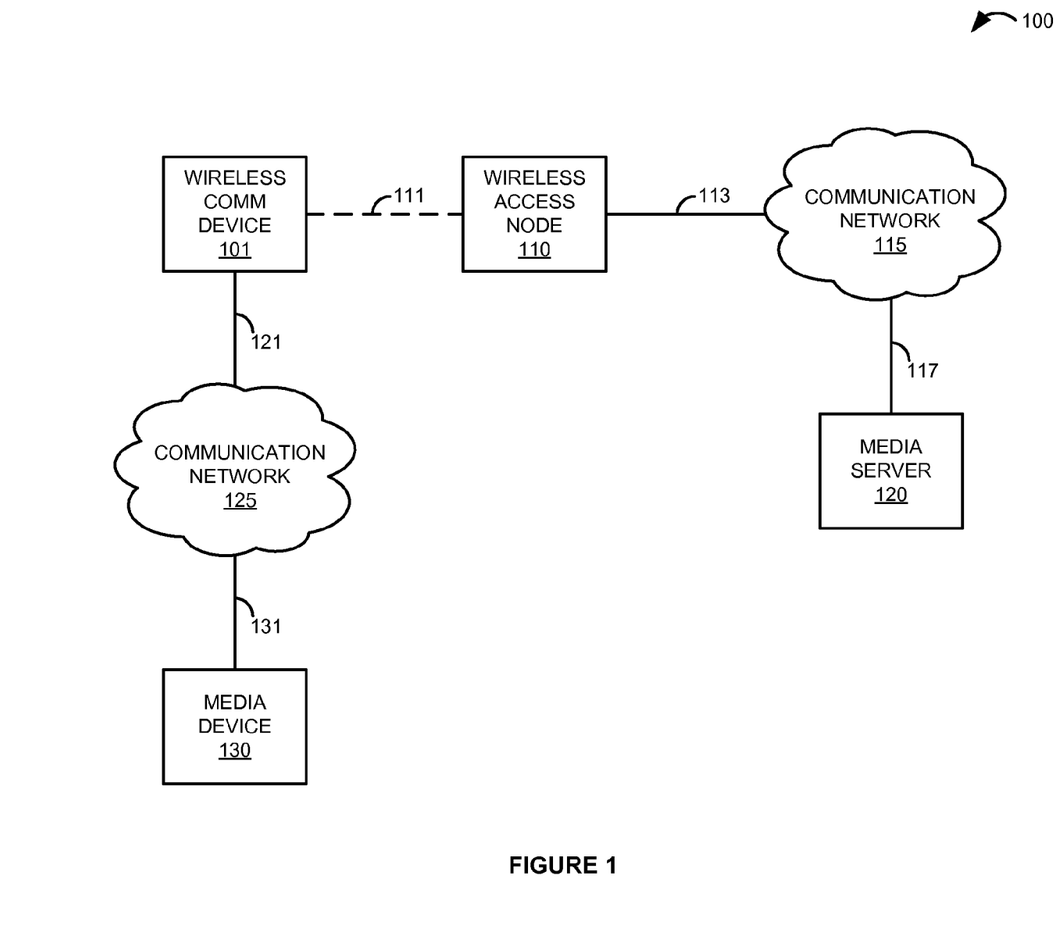
FIG. 1 is a block diagram that illustrates a communication system.

FIG. 1 is a block diagram that illustrates communication system 100. Communication system 100 includes wireless communication device 101, wireless access node 110, communication network 115, media server 120, communication network 125, and media device 130. Wireless communication device 101 is in communication with wireless access node 110 over wireless communication link 111. Wireless access node 110 communicates with communication network 115 over communication link 113. Media server 120 is in communication with communication network 115 over communication link 117. Wireless communication device 101 communicates with communication network 125 over communication link 121. Media device 130 is in communication with communication network 125 over communication link 131.

Figure 2:
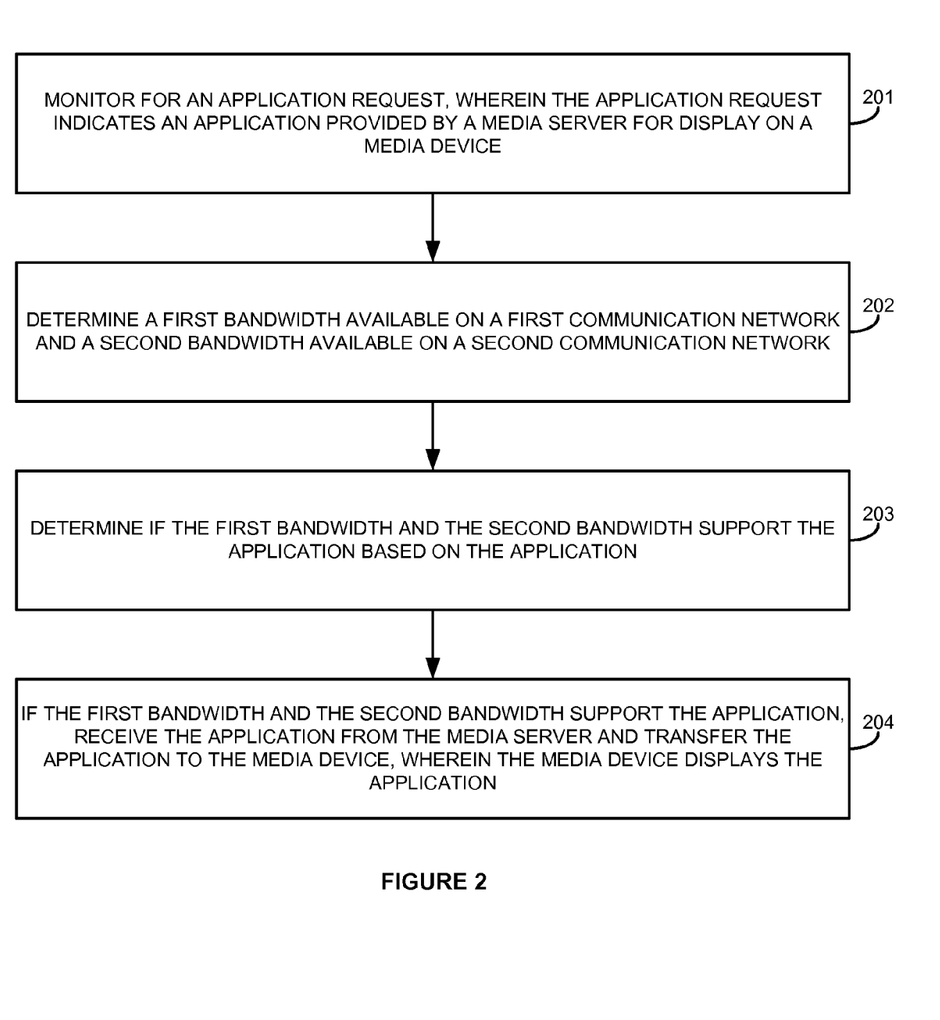
FIG. 2 is a flow diagram that illustrates an operation of the communication system.

FIG. 2 is a flow diagram that illustrates an operation of communication system 100. The steps of the operation are indicated below parenthetically. As shown in FIG. 1, wireless communication device 101 is in communication with media server 120 over communication network 115, and in communication with media device 130 over communication network 125. Wireless communication device 101 monitors for an application request, wherein the application request indicates an application provided by a media server 120 for display on a media device 130 (201).

Typically, the application request is received from a user of wireless communication device 101, such as by pressing a button, typing or speaking a command, or some other user input provided to a user interface of wireless communication device 101. However, in some examples, the application request could be received from media device 130. The application could comprise any streaming content that may be received by wireless communication device 101 from media server 120 over communication network 115. For example, the application could comprise a video stream, audio stream, gaming application, communication session, video conference, shared file editing session, or any other application that may be accessed via communication network 115. In some examples, the application may comprise multiple media streams, such as multiplexed video and audio streams, and may be received from multiple content providers or from the same media server 120.

Wireless communication device 101 determines a first bandwidth available on a first communication network 115 and a second bandwidth available on a second communication network 125 (202). Wireless communication device 101 may determine the first and second bandwidth in a variety of ways. For example, wireless communication device 101 may transfer and receive test packets to determine the bandwidth or latency of communication networks 115 and 125, or may determine the available bandwidth based on the network type of communication networks 115 and 125. Wireless communication device 101 may also test the bandwidth in both directions when determining the first and second bandwidth associated with respective communication networks 115 and 125. Thus, in some examples, such as gaming applications, the first bandwidth comprises a first uplink bandwidth and a first downlink bandwidth available on communication network 115, and the second bandwidth comprises a second uplink bandwidth and a second downlink bandwidth available on communication network 125.

Once the available bandwidth is determined, wireless communication device 101 determines if the first bandwidth and the second bandwidth support the application based on the application (203). To determine if the first bandwidth and the second bandwidth support the application, wireless communication device 101 may analyze the application to determine bandwidth requirements necessary to support the application. For example, in some cases, wireless communication device 101 may receive either a standard or high definition (HD) version of an application, such as a standard definition or HD video stream. In this case, wireless communication device 101 may determine if the first bandwidth available on the first communication network 115 will support uninterrupted streaming of the high definition version of the application, and determine if the second bandwidth available on the second communication network 125 will support the high definition version of the application.

Certain applications may require appropriate bandwidth in both the uplink and the downlink connections. Wireless communication device 101 may determine support for such applications by testing the available bandwidth in both directions when determining the first and second bandwidth associated with respective communication networks 115 and 125. For example, a video conference communication session or a gaming application may both require adequate uplink and downlink bandwidth to function properly. In either case, the first bandwidth available on communication network 115 supports these applications if a first uplink bandwidth and a first downlink bandwidth will support uninterrupted streaming of the application in both directions. Likewise, the uplink and downlink bandwidth between wireless communication device 101 and media device 130 over communication network 125 must support the application to ensure acceptable levels of delay or performance impact during execution of the application, which may be determined by threshold values.

If the first bandwidth and the second bandwidth support the application, wireless communication device 101 receives the application from media server 120 and transfers the application to media device 130, wherein media device 130 displays the application (204). In some examples, media device 130 may display the application using a resolution, color depth, frame rate, audio quality, or codec different from those supported natively by wireless communication device 101. In these circumstances, media device 130 may perform some or all of the processing required for execution and display of the application.

Wireless communication device 101 may perform additional functionality prior to or while receiving the application from media server 120 and transferring the application to media device 130. For instance, in some examples, wireless communication device 101 may determine whether device 101 is operating on a battery power source located within wireless communication device 101 or another power source located externally from wireless communication device 101. Examples of other power sources located externally from wireless communication device 101 could include traditional wall power, an external uninterruptible power supply (UPS), or another device from which wireless communication device 101 may receive a power charge, including media device 130. If wireless communication device 101 is operating on the other power source located externally from device 101, wireless communication device 101 may decode the application internally, since preserving battery power would not be a concern in this case.

In other examples, wireless communication device 101 may determine whether media device 130 comprises an ability to decode the application. For example, media device 130 may have a preferred codec for use with the application which wireless communication device 101 lacks. In this case, wireless communication device 101 may instruct media device 130 to decode the application. In other examples, if wireless communication device 101 determines that device 101 is operating on an internal battery power source, wireless communication device 101 may instruct media device 130 to decode the application, even if device 101 has a preferred codec, in order to preserve the battery power of wireless communication device 101.

Advantageously, wireless communication device 101 assumes the role of a mediator to facilitate the transmission of applications between media server 120 and media device 130. In this manner, wireless communication device 101 can ensure that the bandwidth over communication network 115 to media server 120 and the bandwidth over communication network 125 to media device 130 will support the application, thereby preserving network resources by minimizing failed or canceled transfers. Further, by determining additional considerations such as the power situation of the devices and available or preferred codecs, wireless communication device 101 can determine the most practical and optimal manner of receiving an application from media server 120 for display on media device 130.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus— including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Internet, telephony, or some other communication format—including combinations thereof.

Communication network 115 comprises multiple network elements such as routers, gateways, telecommunication switches, servers, processing systems, or other communication equipment and systems for providing communication and data services. Communication network 115 could comprise wireless communication nodes, telephony switches, Internet routers, network gateways, computer systems, communication links, or some other type of communication equipment—including combinations thereof. Communication network 115 may also comprise optical networks, asynchronous transfer mode (ATM) networks, packet networks, metropolitan-area networks (MAN), or other network topologies, equipment, or systems—including combinations thereof. Communication network 115 may be configured to communicate over metallic, wireless, or optical links. Communication network 115 may be configured to use time-division multiplexing (TDM), Internet Protocol (IP), Ethernet, optical networking, wireless protocols, communication signaling, or some other communication format—including combinations thereof. In some examples, communication network 115 includes further access nodes and associated equipment for providing communication services to many wireless communication devices across a large geographic region.

Media server 120 comprises a computer system and communication interface. Media server 120 may also include other components such as a router, server, data storage system, and power supply. Media server 120 may reside in a single device or may be distributed across multiple devices. Media server 120 may be a discrete system or may be integrated within other systems—including other systems within communication system 100. Media server 120 could comprise a packet gateway, mobile switching center, network gateway system, Internet access node, application server, service node, firewall, or some other communication system—including combinations thereof.

Communication network 125 comprises any network that facilitates communication between wireless communication device 101 and media device 130. Communication network 125 could comprise wireless communication nodes, network switches, Internet routers, network gateways, computer systems, communication links, or some other type of communication equipment—including combinations thereof. Communication network 125 may also comprise an optical network, local area network (LAN), packet network, personal area network (PAN), piconet, or other network topologies, equipment, or systems—including combinations thereof. Communication network 125 may be configured to communicate over metallic, wireless, or optical links. Communication network 125 may be configured to use TDM, IP, Ethernet, optical networking, communication signaling, wireless protocols such as Bluetooth and Wi-Fi, or some other communication format—including combinations thereof.

Media device 130 comprises a display screen and a communication interface. Media device 130 may also include other components such as a processing system, user interface, data storage system, and power supply. Media device 130 may reside in a single device or may be distributed across multiple devices. Media device 130 may be a discrete system or may be integrated within other systems. Media device 130 could comprise a monitor, television, high definition television (HDTV), computer system, satellite navigation system, telephone, PDA, e-book, game console, mobile Internet device, media player, or some other media apparatus—including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 113, 117, 121, and 131 use metal, air, space, optical fiber such as glass or plastic, or some other material as the transport media—including combinations thereof. Communication links 113, 117, 121, and 131 could use various communication protocols, such as TDM, IP, Ethernet, telephony, optical networking, hybrid fiber coax (HFC), communication signaling, wireless protocols, or some other communication format—including combinations thereof. Communication links 113, 117, 121, and 131 may be direct links or could include intermediate networks, systems, or devices.

Figure 3:
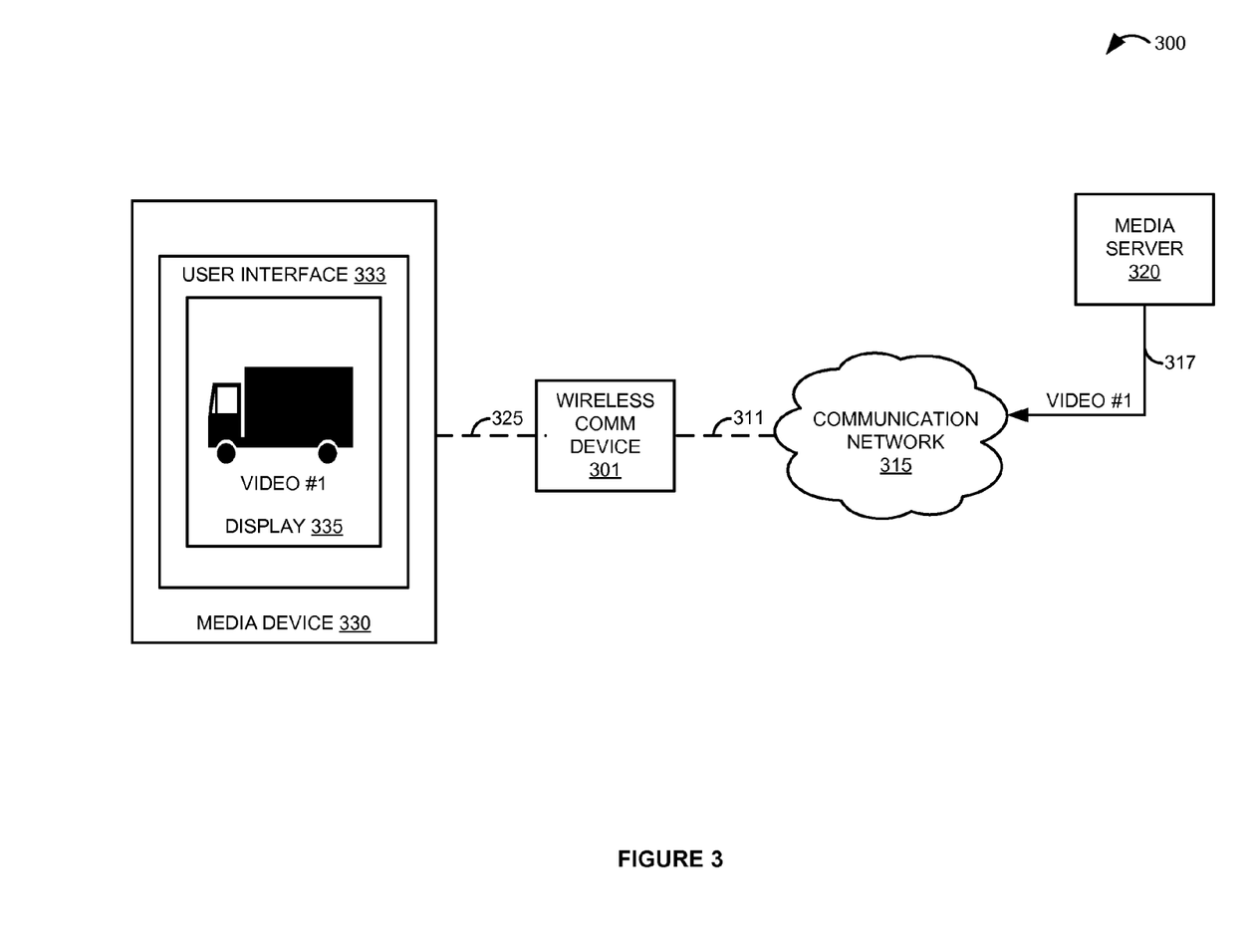
FIG. 3 is a block diagram that illustrates a communication system in an exemplary embodiment.

FIG. 3 is a block diagram that illustrates communication system 300 in an exemplary embodiment. Communication system 300 includes wireless communication device 301, communication network 315, media server 320, and media device 330. Wireless communication device 301 communicates with communication network 315 over wireless communication link 311. Media server 320 is in communication with communication network 315 over communication link 317. Wireless communication device 301 communicates with media device 330 using the Bluetooth protocol over wireless communication link 325. Media device 330 comprises user interface 333 which includes display screen 335.

In FIG. 3, a user of wireless communication device 301 has requested video #1 from media server 320. In this exemplary scenario, media device 330 is located within the user's vehicle, such as a satellite navigation system with display screen and Bluetooth capability. The user was not in the proximity of the vehicle at the time of initially requesting video #1. Thus, video #1 is first streamed to wireless communication device 301 via communication network 315. The attributes of video #1 have a particular frame rate, video resolution, color depth, and audio configuration, such as audio channels and audio quality, which are supported by wireless communication device 301.

When the user enters the vehicle in which media device 330 is installed, wireless communication device 301 pairs with media device 330 over a Bluetooth connection on wireless link 325 using known pairing mechanisms. At this time, wireless communication device 301 determines that the user is within range of media device 330, and the streaming video #1 that is currently being displayed on device 301 could be transferred to media device 330 for display on display screen 335. Wireless communication device 301 may prompt the user for permission to transfer video #1 to media device 330, or may be configured to transfer the video stream automatically once communications are established. However, before transferring video #1 to media device 330, wireless communication device 301 must determine various attributes related to the devices 301 and 330, the video stream, and bandwidth availability.

To begin, wireless communication device 301 determines the capabilities of media device 330. In some examples, media device 330 contains no processing system of its own, and merely consists of a display screen 335 and a communication interface. In this case, wireless communication device 301 may attempt to detect the display capabilities of media device 330 through a video cable connection. In some cases, wireless communication device 301 may simply determine whether it is connected to media device 330 through an analog connection, such as composite video, separate video (S-Video), or a Video Graphics Array (VGA) cable, or though a digital connection, such as a Digital Visual Interface (DVI-D) or high definition multimedia interface (HDMI) cable. Additionally or alternatively, wireless communication device 301 may prompt the user for information related to the capabilities of media device 330, or may present options to the user which may be selected on a user interface of wireless communication device 301.

Once the video capabilities are determined, in some examples wireless communication device 301 may then test the settings provided by the user to ensure proper operation. For example, using the settings provided, wireless communication device 301 may attempt to display a test image on media device 330 and then prompt the user to indicate whether the image is displayed correctly on the display screen 335 of media device 330. In some examples, the capabilities of media device 330 may be predetermined, or once determined, may be stored in wireless communication device 301 for subsequent use. Also, note that audio capabilities of media device 330 may also be determined in a similar manner to determining the video capabilities discussed above.

If wireless communication device 301 determines that media device 330 does not contain a processing system capable of decoding the video, device 301 will decode the video using available codecs installed on device 301 and transfer the uncompressed video signal through either the analog or digital video cable to media device 330. However, to ensure effective utilization of system resources and network bandwidth, wireless communication device 301 must determine the appropriate video and/or audio settings for the requested video. For example, even if wireless communication device 301 is connected to media device 330 with an HDMI cable having enough bandwidth to transfer an uncompressed high definition video, wireless communication device 301 may determine that the bandwidth available over communication network 315 will not support uninterrupted streaming of a high definition video file to media device 330. In this case, wireless communication device 301 would stream a lower quality video to media device 330 over the HDMI connection. In some examples, wireless communication device 301 continually tests or monitors the available bandwidth on communication network 315, and if the bandwidth increases, device 301 may request increased visual attributes of the video from media server 320.

Additional considerations exist when media device 330 contains a processing system capable of decoding a compressed video stream. In this case, wireless communication device 301 must determine whether to decode the video stream internally or simply pass the compressed stream to media device 330. Factors that weigh into this determination include the available codecs installed in each device and the power situation of wireless communication device 301 and/or media device 330.

In order to preserve battery power, wireless communication device 301 determines if device 301 is operating on an internal battery power source and if media device 330 is capable of decoding the video stream. If both are true, wireless communication device 301 passes the compressed video stream to media device 330 for device 330 to decode. However, if wireless communication device 301 determines that device 301 is not operating on battery power, device 301 may decode the video stream internally. In this case, the decision of whether wireless communication device 301 or media device 330 should decode the video stream is governed by the available codecs installed on each respective device.

Generally, given no battery power constraints, wireless communication device 301 determines which device 301 or 330 contains a preferred codec for the application. The preferred codec selection may be determined based on a prioritized list of codecs, which may be predetermined or may be supplied by a user of wireless communication device 301. Alternatively, wireless communication device 301 may determine the preferred codec based on the video stream. If media device 330 has the preferred codec installed, wireless communication device passes the compressed video stream to media device 330 for decoding therein. However, if the preferred codec is installed on wireless communication device 301, device 301 will decode the video stream and transfer the uncompressed digital video to media device 330. In cases where both wireless communication device 301 and media device 330 contain the same preferred codec, wireless communication device may prompt the user for a selection, or may refer to a predetermined default selection for processing of the video stream.

Whether compressed or uncompressed, video #1 is ultimately received by media device 330 and displayed on display screen 335. Ideally, the user of wireless communication device 301 will experience little to no interruption when the content is transferred to media device 330 upon entering the vehicle. Assuming battery power conservation and network bandwidth are not an issue, the highest definition video stream supported by media device 330 and available from media server 320 will be displayed on display screen 335. If bandwidth, battery power, or codec preference are a concern, wireless communication device 301 intelligently determines the video attributes of video #1 to request from media server 320 and the appropriate device 301 or 330 to process the video in consideration of these goals.

Figure 4:
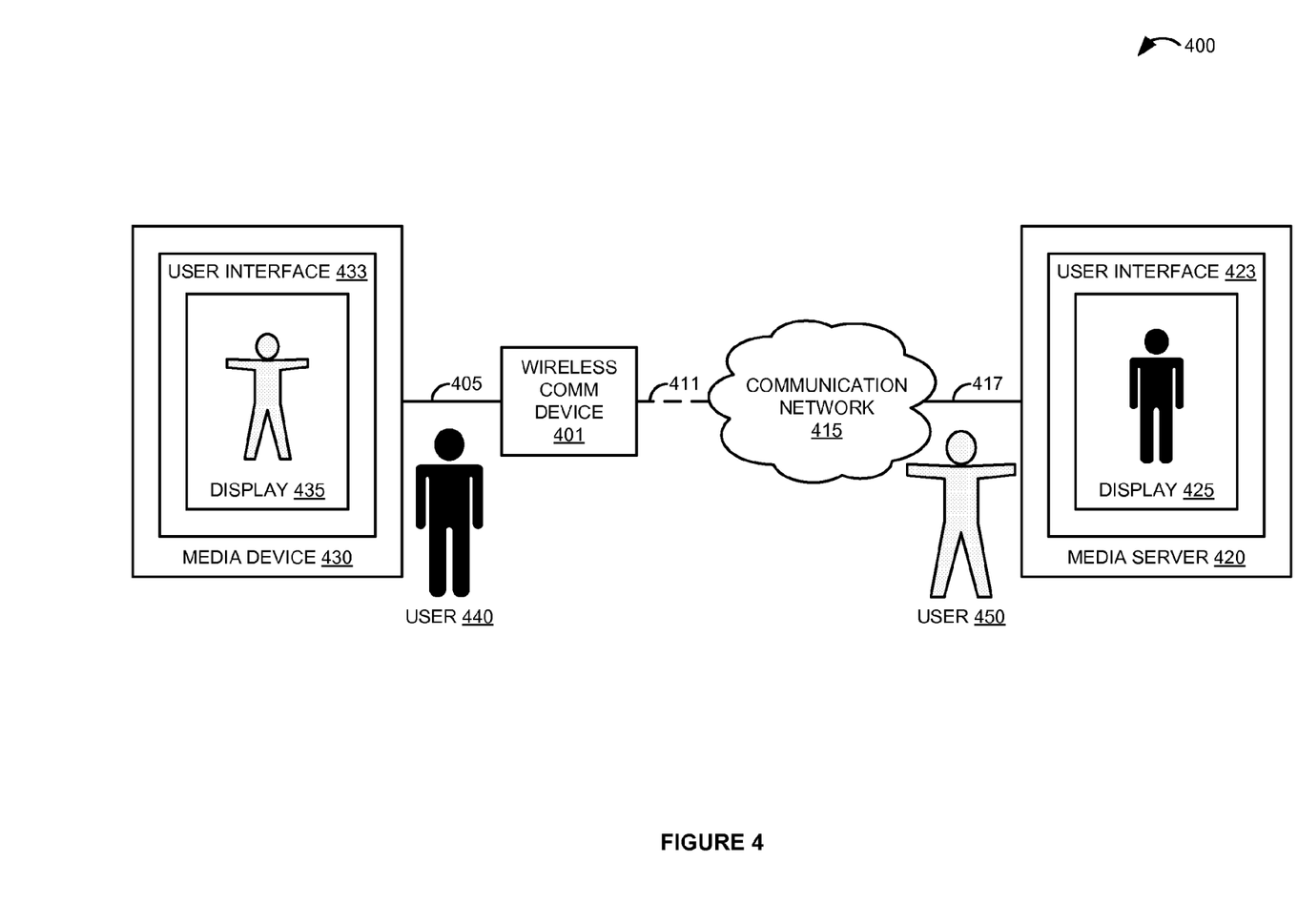
FIG. 4 is a block diagram that illustrates a communication system in an exemplary embodiment.

FIG. 4 is a block diagram that illustrates communication system 400 in an exemplary embodiment. Communication system 400 includes wireless communication device 401, communication network 415, media server 420, and media device 430. Wireless communication device 401 communicates with communication network 415 over wireless communication link 411. Media server 420 is in communication with communication network 415 over communication link 417. Media server 420 comprises user interface 423 which includes display screen 425. Wireless communication device 401 communicates with media device 430 over communication link 405. In this example, communication link 405 comprises a Universal Serial Bus (USB) connection. Media device 430 comprises user interface 433 which includes display screen 435.

In FIG. 4, user 440 is operating wireless communication device 401 and media device 430, while user 450 is operating media server 420. In this exemplary scenario, users 440 and 450 are actively engaged in a video conference communication session. Thus, a video of user 450 is displayed on display screen 435 of media device 430 for viewing by user 440. Likewise, a video of user 440 is displayed on display screen 425 of media server 420 for viewing by user 450. Therefore, wireless communication device 401 is both receiving a video stream from media server 420 and transferring a video stream to media server 420. Wireless communication device 401 must therefore determine the available bandwidth in both the uplink and the downlink directions to ensure support for this video conference session.

Wireless communication device 401 determines whether the downlink bandwidth available over communication network 415 is sufficient to provide steady playback of the video stream from media server 420 given the current or optimal video attributes. If the downlink bandwidth is lacking, wireless communication device will request a lower resolution video stream from media server 420 to adjust for the network conditions on communication network 415. Likewise, wireless communication device 401 determines whether the uplink bandwidth on communication network 415 is sufficient to provide steady playback of the video stream transferred to media server 420. Given insufficient uplink bandwidth, wireless communication device 401 will transfer a lower resolution video stream to media server 420, even if media server 420 requests a higher definition feed.

Additionally, wireless communication device 401 monitors the bandwidth on communication link 405 between device 401 and media device 430. If the available downlink bandwidth on communication link 405 does not support high definition video attributes, wireless communication device 401 will request a lower definition stream from media server 420 to avoid unnecessarily wasting bandwidth over communication network 415. For example, if communication link 405 is a Bluetooth 2.0 connection, which cannot support a full 1,080 lines of progressive uncompressed digital video, wireless communication device 401 would request a video stream with standard definition attributes that will ensure an uninterrupted display of the video on media device 430 while preserving bandwidth on communication network 415.

Similarly, wireless communication device 401 may monitor the uplink bandwidth of communication link 405 during the video conference if media device 430 is capturing a video stream of user 440 and transferring the video to wireless communication device 401 over link 405. For example, user interface 433 of media device 430 could include a camera and microphone for recording video and audio information. In this case, wireless communication device 401 will only request video and audio attributes that are supported by the uplink bandwidth on communication link 405. In this manner, wireless communication device 401 determines and negotiates the video and/or audio attributes of both the video streamed from media server 420 to media device 430 and the video streamed from media device 430 to media server 420.

Figure 5:
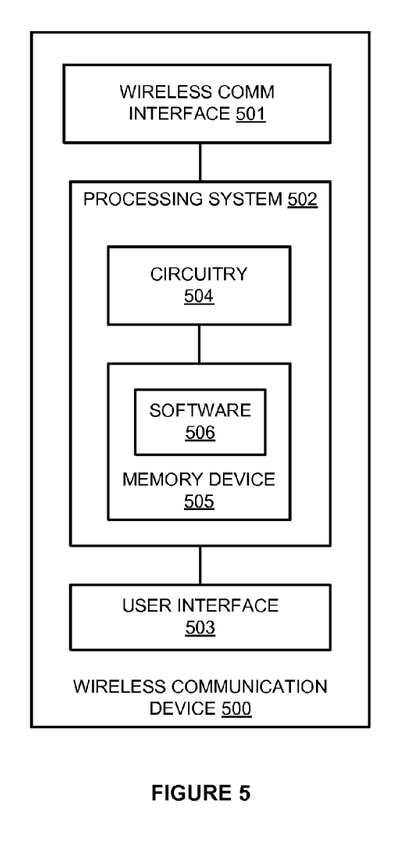
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication interface 501, processing system 502, and user interface 503. Processing system 502 is linked to wireless communication interface 501 and user interface 503. Processing system 502 includes processing circuitry 504 and memory device 505 that stores operating software 506. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication interface 501 comprises RF communication circuitry and an antenna. The RF communication circuitry typically includes an amplifier, filter, RF modulator, and signal processing circuitry. Wireless communication interface 501 may also include a memory device, software, processing circuitry, or some other communication device. Wireless communication interface 501 may use various protocols, such as CDMA, GSM, UMTS, HSPA, EV-DO, EV-DO rev. A, 3GPP LTE, WiMAX, Wi-Fi, or some other wireless communication format. Wireless communication interface 501 is configured to receive an application from a media server and transfer the application to a media device.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may omitted in some examples.

Processing circuitry 504 comprises microprocessor and other circuitry that retrieves and executes operating software 506 from memory device 505. Memory device 505 comprises a disk drive, flash drive, data storage circuitry, or some other memory apparatus. Processing circuitry 504 is typically mounted on a circuit board that may also hold memory device 505 and portions of communication interface 501 and user interface 503. Operating software 506 comprises computer programs, firmware, or some other form of machine-readable processing instructions. Operating software 506 may include an operating system, utilities, drivers, network interfaces, applications, or some other type of software. When executed by processing circuitry 504, operating software 506 directs processing system 502 to operate wireless communication device 500 as described herein. In particular, operating software 506 directs processing system 502 to monitor for an application request, wherein the application request indicates an application provided by the media server for display on the media device. Further, operating software 506 directs processing system 502 to determine a first bandwidth available on a first communication network and a second bandwidth available on a second communication network, and determine if the first bandwidth and the second bandwidth support the application based on the application.

Figure 6:
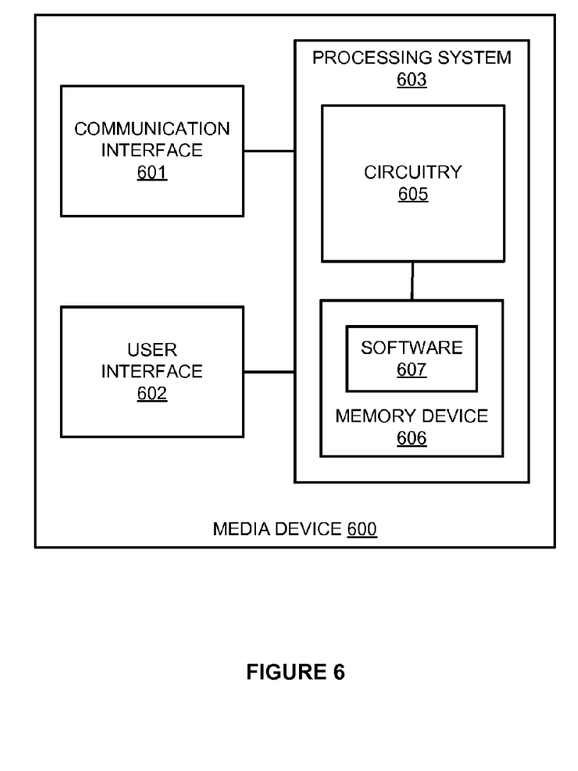
FIG. 6 is a block diagram that illustrates a media device.

FIG. 6 is a block diagram that illustrates media device 600. Media device 600 provides an example of media device 130, although device 130 may use alternative configurations. Media device 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate media device 600 as described herein. In particular, operating software 607 directs processing system 603 to display an application on user interface 602.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device capable of communication with a media server over a first communication network and capable of communication with a media device over a second communication network, the wireless communication device comprising:
    a processing system configured to monitor for an application request, wherein the application request indicates an application provided by the media server for display on the media device, determine a first bandwidth available on the first communication network and a second bandwidth available on the second communication network, and determine if the first bandwidth and the second bandwidth support the application based on the application, and;
    a wireless communication interface configured to, if the first bandwidth and the second bandwidth support the application, receive the application from the media server and transfer the application to the media device, wherein the media device displays the application.

2. The wireless communication device of claim 1 further comprising the processing system configured to determine whether the wireless communication device is operating on a battery power source located within the wireless communication device or another power source located externally from the wireless communication device.

3. The wireless communication device of claim 2 further comprising the processing system configured to decode the application if the wireless communication device is operating on the other power source located externally from the wireless communication device.

4. The wireless communication device of claim 2 further comprising the processing system configured to determine whether the media device comprises an ability to decode the application, and if the media device comprises the ability to decode the application and the wireless communication device is operating on the battery power source, instruct the media device to decode the application.

5. The wireless communication device of claim 1 wherein the first bandwidth comprises a first uplink bandwidth and a first downlink bandwidth available on the first communication network, and the second bandwidth comprises a second uplink bandwidth and a second downlink bandwidth available on the second communication network.

6. The wireless communication device of claim 5 wherein the application comprises a video conference communication session and the first bandwidth supports the application if the first uplink bandwidth and the first downlink bandwidth will support uninterrupted streaming of the video conference communication session.

7. The wireless communication device of claim 1 wherein the processing system, to determine if the first bandwidth and the second bandwidth support the application based on the application, determines if the first bandwidth available on the first communication network will support uninterrupted streaming of a high definition version of the application, and determines if the second bandwidth available on the second communication network will support the high definition version of the application.

8. The wireless communication device of claim 7 wherein the wireless communication device receives the high definition version of the application from the media server and transfers the high definition version of the application to the media device if the first bandwidth will support uninterrupted streaming of the high definition version of the application and if the second bandwidth will support the high definition version of the application.

9. The wireless communication device of claim 1 wherein the first communication network comprises a wide area network (WAN) and the second communication network comprises a local area network (LAN).

10. The wireless communication device of claim 1 wherein the second communication network comprises a Bluetooth personal area network (PAN).

11. A method of operating a wireless communication device capable of communication with a media server over a first communication network and capable of communication with a media device over a second communication network, the method comprising:
    monitoring for an application request, wherein the application request indicates an application provided by the media server for display on the media device;
    determining a first bandwidth available on the first communication network and a second bandwidth available on the second communication network;
    determining if the first bandwidth and the second bandwidth support the application based on the application; and
    if the first bandwidth and the second bandwidth support the application, receiving the application from the media server and transferring the application to the media device, wherein the media device displays the application.

12. The method of claim 11 further comprising determining whether the wireless communication device is operating on a battery power source located within the wireless communication device or another power source located externally from the wireless communication device.

13. The method of claim 12 further comprising, in the wireless communication device, decoding the application if the wireless communication device is operating on the other power source located externally from the wireless communication device.

14. The method of claim 12 further comprising determining whether the media device comprises an ability to decode the application, and if the media device comprises the ability to decode the application and the wireless communication device is operating on the battery power source, instructing the media device to decode the application.

15. The method of claim 11 wherein the first bandwidth comprises a first uplink bandwidth and a first downlink bandwidth available on the first communication network, and the second bandwidth comprises a second uplink bandwidth and a second downlink bandwidth available on the second communication network.

16. The method of claim 15 wherein the application comprises a video conference communication session and the first bandwidth supports the application if the first uplink bandwidth and the first downlink bandwidth will support uninterrupted streaming of the video conference communication session.

17. The method of claim 11 wherein determining if the first bandwidth and the second bandwidth support the application based on the application comprises determining if the first bandwidth available on the first communication network will support uninterrupted streaming of a high definition version of the application and determining if the second bandwidth available on the second communication network will support the high definition version of the application.

18. The method of claim 17 wherein receiving the application from the media server and transferring the application to the media device comprises receiving the high definition version of the application from the media server and transferring the high definition version of the application to the media device if the first bandwidth will support uninterrupted streaming of the high definition version of the application and if the second bandwidth will support the high definition version of the application.

19. The method of claim 11 wherein the first communication network comprises a wide area network (WAN) and the second communication network comprises a local area network (LAN).

20. A wireless communication device capable of communication with a media server over a first communication network and capable of communication with a media device over a second communication network, the wireless communication device comprising:
  a processing system configured to monitor for an application request, wherein the application request indicates an application provided by the media server for display on the media device, determine a first bandwidth available on the first communication network and a second bandwidth available on the second communication network, determine if the first bandwidth and the second bandwidth support the application based on the application, determine whether the wireless communication device is operating on a battery power source located within the wireless communication device or another power source located externally from the wireless communication device, and determine whether the media device comprises an ability to decode the application; and
  a wireless communication interface configured to, if the first bandwidth and the second bandwidth support the application, receive the application from the media server and transfer the application to the media device; and
  the processing system further configured to instruct the media device to decode the application if the media device comprises the ability to decode the application and the wireless communication device is operating on the battery power source.

* * * * *